US010463936B1

(12) United States Patent
Lanuti

(10) Patent No.: US 10,463,936 B1
(45) Date of Patent: Nov. 5, 2019

(54) MINIATURE GOLF COURSE EDGING BLOCK

(71) Applicant: Creative Works, Inc., Mooresville, IN (US)

(72) Inventor: Armando Lanuti, Carmel, IN (US)

(73) Assignee: Creative Works, Inc., Mooresville, IN (US)

( * ) Notice: Subject to any disclaimer, the term of this patent is extended or adjusted under 35 U.S.C. 154(b) by 0 days.

(21) Appl. No.: 16/136,251

(22) Filed: Sep. 20, 2018

(51) Int. Cl.
| A63B 67/02 | (2006.01) |
| A63B 71/06 | (2006.01) |
| A63B 102/32 | (2015.01) |
| A01G 9/28 | (2018.01) |

(52) U.S. Cl.
CPC ............. *A63B 67/02* (2013.01); *A01G 9/28* (2018.02); *A63B 71/0622* (2013.01); *A63B 2102/32* (2015.10); *A63B 2209/00* (2013.01)

(58) Field of Classification Search
CPC .................................. A01G 9/28; A63B 67/02
USPC .......................... 473/157–162; 47/33; 52/102
See application file for complete search history.

(56) References Cited

U.S. PATENT DOCUMENTS

| 2,827,299 | A | * | 3/1958 | Dean | A63B 67/02 273/127 B |
| 4,160,550 | A | * | 7/1979 | Barrett | A63B 63/00 473/13 |
| 5,366,224 | A | * | 11/1994 | Stanwyck | A63B 67/02 404/35 |
| 5,564,240 | A | * | 10/1996 | Dean, Jr. | E01C 5/00 47/33 |
| 5,749,789 | A | * | 5/1998 | Karl | A63B 67/02 473/158 |
| 5,765,828 | A | * | 6/1998 | Baker | A63F 7/0628 273/108.2 |
| 6,695,544 | B2 | * | 2/2004 | Knudson | E02D 29/025 220/601 |
| 9,433,872 | B2 | * | 9/2016 | Rodstein | A63H 33/082 |
| 2002/0169027 | A1 | * | 11/2002 | Fowler | A63B 67/02 473/157 |
| 2004/0088929 | A1 | * | 5/2004 | Dawson | A01G 9/28 52/102 |
| 2005/0081437 | A1 | * | 4/2005 | Heinemann | A01G 9/28 47/33 |
| 2005/0252101 | A1 | * | 11/2005 | Anderson | A01G 9/28 52/102 |

* cited by examiner

*Primary Examiner* — Mark S Graham
(74) *Attorney, Agent, or Firm* — Larson & Larson, P.A.; Frank Liebenow; Justin P. Miller

(57) ABSTRACT

An edging block for miniature golf courses includes a top section that has a top surface that has a trapezoidal shape and four substantially rectangular walls depending down and at substantially right angles to the top surface. Each edging block has a bottom section with a congruent trapezoidal shape. There are two non-parallel sides, each of which has a protrusion and a receiver situated such that when one of the non-parallel sides aligns with a second non-parallel side of a second edging block, the protrusion of the one of the non-parallel sides inserts into the receiver of the second parallel side of the second edging block and, a protrusion of the second parallel side of the second edging block inserts into the receiver of the one of the non-parallel sides. There is also a feature for holding the top section to the bottom section.

14 Claims, 5 Drawing Sheets

MINIATURE GOLF COURSE EDGING BLOCK

FIELD

This invention relates to the field of entertainment and more particularly to a system for constructing miniature golf courses.

BACKGROUND

Miniature golf courses provide entertainment to countless thousands of people. The standard miniature golf course consists of a tee platen, a green, one or more obstacles, and at least one hole. The object of miniature golf is to hit a golf ball using a putting club towards the hole, getting around/through any obstacles, and hopefully getting the golf ball into the hole.

Once a person has played a given miniature golf course, some of the pleasure ebbs, as the course is substantially static and after a few rounds, people often lose interest and chose to not return to that particular miniature golf course.

To increase diversity and dynamics of a miniature golf course, some miniature golf course s have moving items such as a windmill of blockage over a tunnel, adding a bit to the dynamics of playing that miniature golf course, spurring improved interest. Also, some miniature golf course s have a "19$^{th}$ hole" challenge that, if the player gets a hole-in-one (gets the golf ball into the hole with one stroke of the golf club), that player wins a free game (round). Still, after a few rounds, many miniature golfers chose to play at a different miniature golf course to experience a different set of challenges.

Further, the construction of miniature golf course s hasn't changed significantly over the past few decades. miniature golf course construction typically consists of a paved surface (typically cement) having paver stones for outlining each miniature green, a carpet material covering the paved surface between the pavers to slow down the ball, a cup embedded in a hole as a target of a user's putt, and a one or more obstacles such as tunnels, bumpers, bumps, loops, windmills, curves, angles, etc.

What is needed is a miniature golf course system that will improve deployment and reconfiguration while providing enhanced features to maintain the interest of miniature golfers.

SUMMARY

In one embodiment, an edging block for miniature golf courses is disclosed including a top section that has a top surface that has a trapezoidal shape and four substantially rectangular walls depending down and at substantially right angles to the top surface. Each edging block also has a bottom section with a congruent trapezoidal shape. There are two non-parallel sides, each of which has a protrusion and a receiver situated such that when one of the non-parallel sides aligns with a second non-parallel side of a second miniature golf course edging block, the protrusion of the one of the non-parallel sides inserts into the receiver of the second parallel side of the second miniature golf course edging block and, a protrusion of the second parallel side of the second miniature golf course edging block inserts into the receiver of the one of the non-parallel sides. There is also a feature for holding the top section to the bottom section.

In another embodiment, a method of edging a miniature golf course green is disclosed including laying out a plurality of edging blocks to form a miniature golf course green. Each edging block has a top section with a top surface that has a trapezoidal shape and four substantially rectangular walls depending down and at substantially right angles to the top surface. Each edging block also has bottom section that has a congruent trapezoidal shape with a first non-parallel side and a second non-parallel side. Each of the non-parallel sides has a protrusion and a receiver. There are features for holding the top section to the bottom section. The method continues with forming a straight edging sections by inserting the protrusion of the first non-parallel side of a first edging block of the plurality of edging blocks into a receptacle of the first non-parallel side of a second edging block of the plurality of edging blocks and inserting a protrusion of the first non-parallel side of the second edging block of the plurality of edging blocks into the receptacle of the first non-parallel side of the first edging block of the plurality of edging blocks.

In another embodiment, an edging block for miniature golf courses is disclosed including a top section that has a top surface that has a trapezoidal shape with four substantially rectangular walls depending down and at substantially right angles to the top surface. The top section is made from a transparent or translucent plastic material. A bottom section has a congruent trapezoidal shape with two non-parallel sides. Each of the non-parallel sides of the bottom section has a protrusion and a receiver situated such that when one of the non-parallel sides aligns with a second non-parallel side of a second miniature golf course edging block, the protrusion of the one of the non-parallel sides inserts into the receiver of the second parallel side of the second miniature golf course edging block and, a protrusion of the second parallel side of the second miniature golf course edging block inserts into the receiver of the one of the non-parallel sides. There are features for removably holding the top section to the bottom section so that the top section is removable from the bottom section without breaking either the top section or the bottom section.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
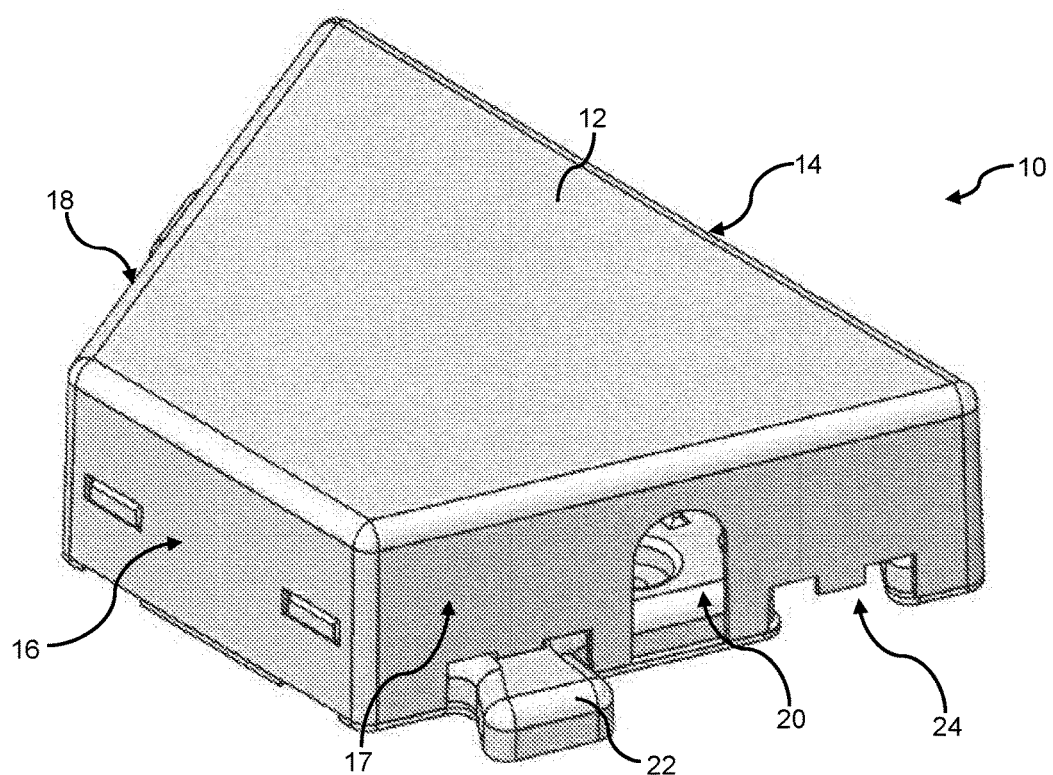
FIG. 1 illustrates a perspective view of an edging block of the present invention.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a perspective view of an edging block 10 of the present invention is shown. Each edging block 10 is of generally trapezoid shape, having a top section that is shaped as a trapezoid with two parallel sides 14/16, and two non-parallel sides 17/18. As will be shown in the discussion of FIG. 9, this trapezoidal shape lends to arranging the edging blocks 10 into either a straight configuration by alternating the direction of adjacent edging blocks 10 or in a curved configuration by not altering the direction of adjacent edging blocks 10.

In some embodiments, each side 14/16/17/16 is in the shape of a rectangle and each side depends substantially perpendicularly from the top section.

Each edging block 10 has a protrusion 22 and a receiver 24. The protrusion 22 of a first edging block 10 fits within a receiver 24 of an adjacent edging block 10. In one embodiment, each edging block 10 is made of two sections, a bottom section 40 (see FIGS. 2 and 3), and a top section 12 having a top surface. The top section 12 has an aperture 20 for routing wiring or other features (e.g. plumbing) through several edging blocks 10 (see FIGS. 9 and 10).

Figure 2:
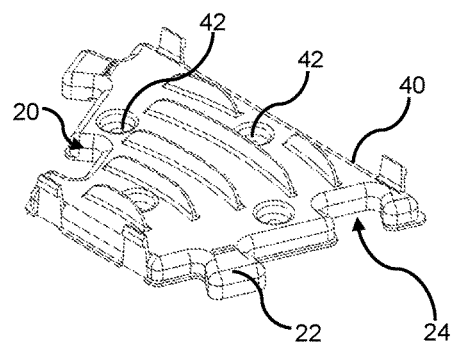
FIG. 2 illustrates a perspective view of a bottom section of the edging block.
Figure 3:
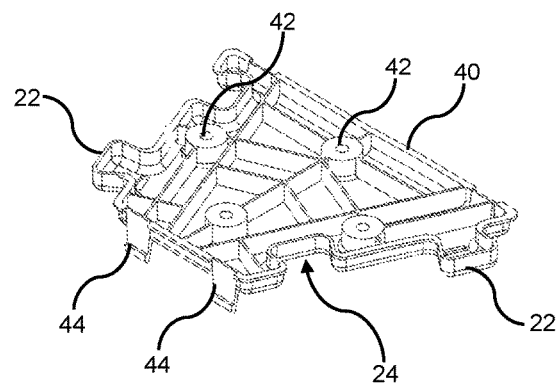
FIG. 3 illustrates a perspective view of the opposite side of the bottom section of the edging block.

Referring to FIGS. 2 and 3, perspective views of a bottom section 40 of the edging blocks 10 are shown. The bottom sections 40 include the protrusions 22 and the receivers 24. The protrusion 22 of a first bottom section 40 fits within the receiver 24 of an adjacent bottom section 40. It is anticipated that in some embodiments, the protrusion 22 of a first bottom section 40 fits tightly within the receiver 24 of an adjacent bottom section 40 to hold adjacent bottom sections 40 together while laying out a miniature golf course green, then once the desired border shape is realized, the bottom sections 40, after being arranged, are affixed to the substrate of the miniature golf course green (e.g. affixed to the pavement). Although any form of affixing the bottom sections 40 to the substrate of the miniature golf course green is anticipated, the bottom sections 40 include one or more through holes 42 through which taps or screws (not shown for clarity reasons) are passed, then secured into the substrate.

The bottom sections 40 include a mechanism used to lock the top section 12 to the bottom section 40. Although there are many such locking mechanisms used in the industry of joining plastic components, a set of resilient flanges 44 are used to lock the top section 12 to the bottom section. The resilient flanges 44 spring into lock receivers 26 (see FIGS. 4 and 5) when the top section 12 is installed onto the bottom sections 40. Although not required, in some embodiments, the lock receivers 26 are accessible from outside of the top section 12 so that the top section 12 is later removable from the bottom section 40, for example, to change or fix an electrical circuit within the edging block 10.

Any material suitable for constructing the bottom section 40 is anticipated, including any type of plastic. It is preferred that the material used to fabricate the bottom section is stiff and durable material that is translucent or transparent, allowing light penetration.

Figure 4:
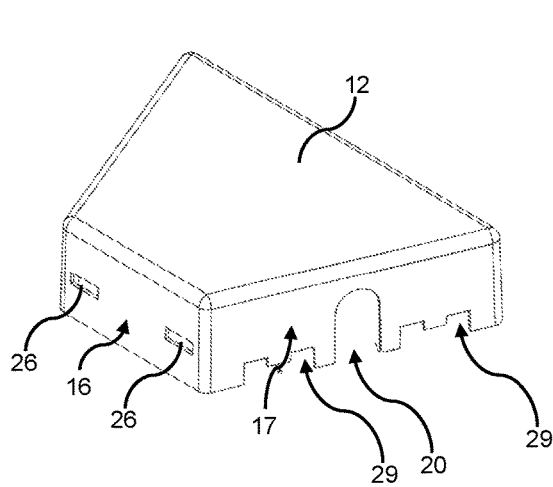
FIG. 4 illustrates a perspective view of a top section of the edging block.
Figure 5:
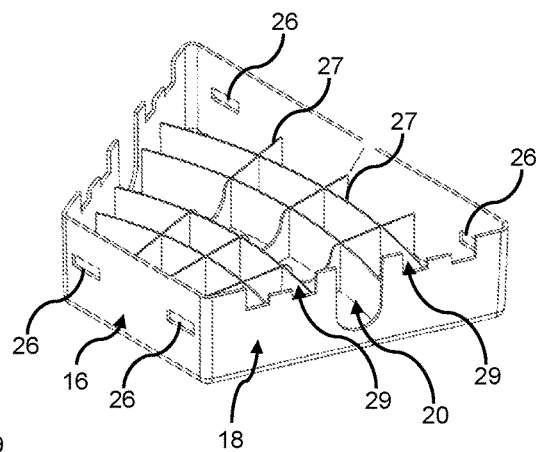
FIG. 5 illustrates a perspective view of the opposite side of the top section of the edging block.

Referring to FIGS. 4 and 5, perspective views of a top section 12 of the edging blocks 10 are shown. The top section 12 provides parallel sides 14/16 that will define the boundary of the miniature golf course green. The top sections 12 snap onto the bottom sections 40 and are lock thereto by one or more resilient flanges 44 of the bottom section 40 locking into lock receivers 26 or the top section 12.

As it is anticipated that in normal use, the assembled edging blocks 10 will be stepped on, in some embodiments, internal ribs 27 provide increased strength, especially when the top section 12 is molded from a plastic material.

The top section 12 includes openings 29 that expose the protrusions 22 and the receivers 24 of the bottom section 40. The top section 12 has an aperture 20 for routing wiring or other features (e.g. plumbing) through several edging blocks 10 (see FIGS. 9 and 10).

Any material suitable for constructing the top section 12 is anticipated, including any type of plastic. It is preferred that the material used to fabricate the top section 12 is stiff and durable material having any level of translucence. In some embodiments, the material used to fabricate the top section 12 is transparent, clear or translucent. In such embodiments in which the top section 12 is translucent, clear or translucent, electronic circuit 54 (e.g. an illumination devices, see FIG. 9) such as lamps, light-emitting diodes, etc., are positioned within the edging blocks 10 and, upon applying power to the electronic circuit 54 (e.g. illumination device), light is emitted from the top section 12 of the edging blocks 10. Further, in some embodiments, other electrical components are housed within the edging blocks, for example, ball sensors or pressure sensors (not shown for clarity and brevity reasons). Such sensors are anticipated to be used to detect when the ball is close the one of the edging blocks 10 to illuminate that edging block differently (e.g. flashing or color change), to initiate action of an obstacle or feature (e.g. start movement of an object), or to sound a warning to reduce the golfers urge to step on the edging blocks . . . .

Figure 6:
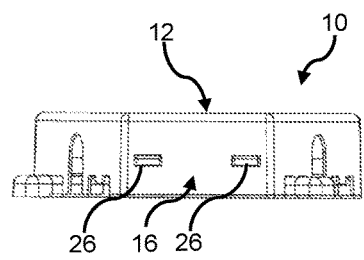
FIG. 6 illustrates a front elevation view of the edging block.
Figure 7:
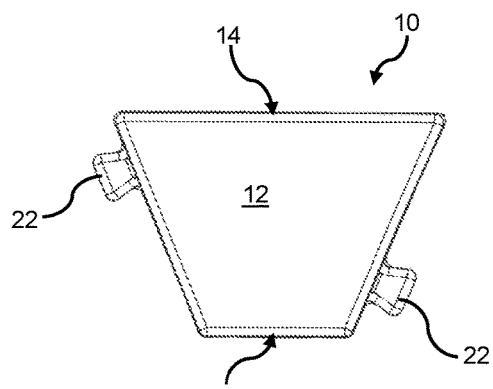
FIG. 7 illustrates a top plan view of the edging block.
Figure 8:
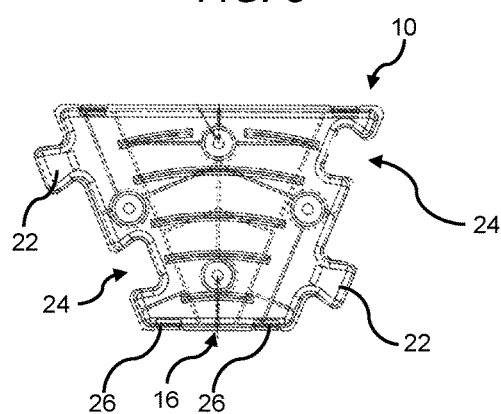
FIG. 8 illustrates a bottom plan view of the edging block.

Referring to FIGS. 6, 7, and 8, alternate views of the edging blocks 10 are shown. In FIG. 6, the edging block 10 is shown from the front. In FIG. 7 edging block 10 is shown from the top, and in FIG. 8 edging block 10 is shown from the bottom.

Figure 9:
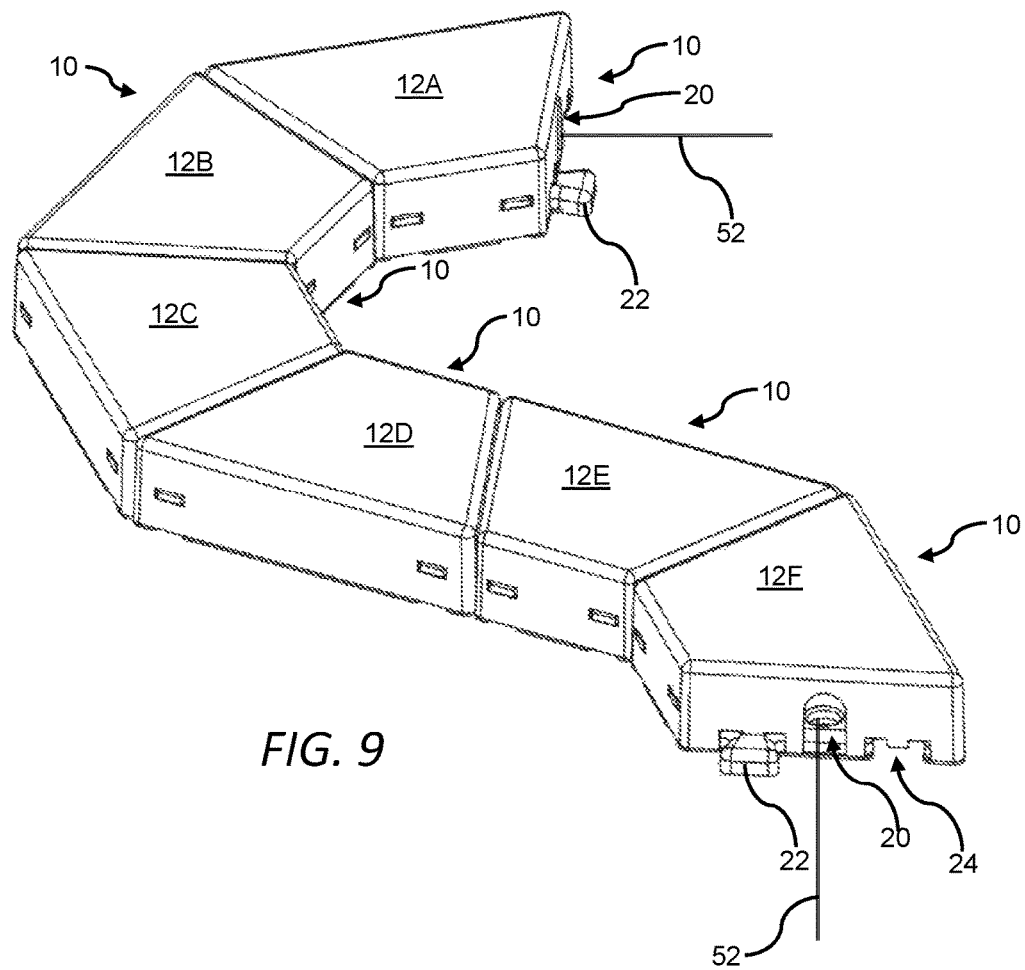
FIG. 9 illustrates a section of edging blocks connected to form a miniature golf course border.

Referring to FIG. 9, a section of several edging blocks 10 is shown connected to form a miniature golf course border. In this view, it is shown how straight or curved edges are formed. For example, a first subset of edging blocks 12A/12B/12C/12D are connected with their non-parallel sides 17/18 alternating (e.g. a non-parallel side 17 of a second edging block 12B connected to a second non-parallel side 16 of a first edging block 12A). Likewise, another subset of edging blocks 12E/12F are connected to curve in an opposite direction.

In this view, straight edges are formed, for example, shown by two edging blocks 12D/12E connected with their non-parallel sides 17/18 not alternating (e.g. a non-parallel side 17 of edging block 12D connected to a non-parallel side 17 of edging block 12E). Any length of straight section is anticipated through this form of connection.

Figure 10:
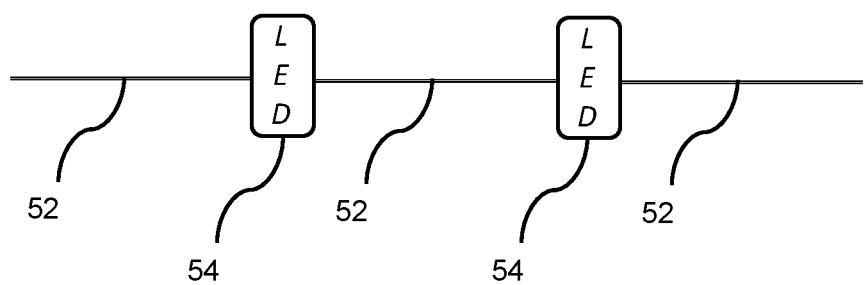
FIG. 10 illustrates an example of an electric circuit installed within the edging blocks.

Also shown in FIG. 9 is an electrical wire 52 routed into the aperture 20 of the first edging block 12A and out of the aperture 20 of the last edging block 12F, passing through each of the edging blocks 12A/12B/12C/12D/12E/12F. As shown in FIG. 10, an electrical circuit 54 such as an illumination device or a sensor, sound emitter, vibration device, fan, etc., is installed in one or more of the edging blocks 12A/12B/12C/12D/12E/12F and power/control is provided through one or more electrical wires 52. In some embodiments, other types of conduit pass into the aperture 20 of the first edging block 12A and out of the aperture 20 of the last edging block 12F. For example, a tube or pipe passes through the edging blocks 10 to plumb a supply of water to a miniature golf course feature such as a fountain, etc. In some embodiments, such conduit is connected to a feature build into the edging block 10, for example, to emit a liquid directly out of the edging block 10 such as a squirt of water, etc.

Referring to FIG. 10, an example of an electric circuit 54 installed within the edging blocks 10 is shown. In this example, the electrical circuits 54 are shown as illumination devices, typically one per edging block 10, but there are no limitations as to the location or orientation of such electrical circuits 54, as some edging blocks 10 include multiple electrical circuits 54 while some edging blocks 10 are void of any electrical circuit 54. The electrical wire 52 is anticipated to have one or more conductors to provide control of different sections of edging blocks or receive sense inputs from electrical circuits that sense things such as ball presence or people stepping on the edging block 10.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An edging block for miniature golf courses comprising:
   a top section having a top surface that has a trapezoidal shape and four substantially rectangular walls depending down and at substantially right angles to the top surface;
   a bottom section having a congruent trapezoidal shape having two non-parallel sides, each of the non-parallel sides of the bottom section has a protrusion and a receiver situated such that when a first non-parallel side of the non-parallel sides of a first edging block aligns with the first non-parallel side of the non-parallel sides of a second edging block, the protrusion of the first non-parallel side of the first edging block inserts into the receiver of the first non-parallel side of the second edging block and, the protrusion of the first non-parallel side of the second edging block inserts into the receiver of the first non-parallel side of the first edging block, forming a non-linear arrangement of the first and second edging blocks;
   when the first non-parallel side of the non-parallel sides of the first edging block aligns with a second non-parallel side of the non-parallel sides of the second edging block, the protrusion of the first non-parallel side of the first edging block inserts into the receiver of the second non-parallel side of the second edging block and, a protrusion of the second non-parallel side of the second edging block inserts into the receiver of the first non-parallel side of the first edging block, forming a linear arrangement of the first and second edging blocks; and
   means for holding the top section to the bottom section.

2. The edging block of claim 1, wherein the means for holding the top section to the bottom section removably holds the top section to the bottom section enabling removal without breaking either the top section or the bottom section.

3. The edging block of claim 2, wherein the means for holding the top section to the bottom section comprises a plurality of resilient clips extending from the bottom section, each of the plurality of resilient clips interfacing with a lock receiver of the top section.

4. The edging block of claim 1, wherein each of the non-parallel sides includes an aperture, the aperture provides a passageway between edging blocks through which a wire, a tube, or a pipe pass through.

5. The edging block of claim 1, wherein the edging block contains an electronic circuit.

6. The edging block of claim 1, wherein all sides and a top of the edging block are made of a material that is transparent or translucent.

7. The edging block of claim 1, wherein the top section comprises a plurality of ribs, the ribs providing additional structural support.

8. The edging block of claim 5, wherein the edging block is translucent or transparent and the electronic circuit comprises an illumination device that, when energized, emits light that is visible from outside of the edging block.

9. An edging block for miniature golf courses comprising:
   a top section having a top surface that has a trapezoidal shape and four substantially rectangular walls depending down and at substantially right angles to the top surface, the top section made from a transparent or translucent plastic material;
   a bottom section having a congruent trapezoidal shape having two non-parallel sides, each of the two non-parallel sides has an aperture for running cables, each of the non-parallel sides of the bottom section has a protrusion and a receiver situated such that when a first non-parallel side of the non-parallel sides of a first edging block aligns with a first non-parallel side of a second edging block, the protrusion of the first non-parallel side of the first edging block inserts into the receiver of the first non-parallel side of the second edging block and, the protrusion of the first non-parallel side of the second edging block inserts into the receiver of the first non-parallel side of the first edging block, forming a non-linear arrangement of the first and second edging blocks in which the apertures align;
   when the first non-parallel side of the non-parallel sides of the first edging block aligns with a second non-parallel side of the non-parallel sides of the second edging block, the protrusion of the first non-parallel side of the first edging block inserts into the receiver of the second non-parallel side of the second edging block and, a protrusion of the second non-parallel side of the second edging block inserts into the receiver of the first non-parallel side of the first edging block, forming a linear arrangement of the first and second edging blocks in which the apertures align; and
   means for removably holding the top section to the bottom section;
   whereas the means for removably holding the top section to the bottom section enables removal without breaking either the top section or the bottom section.

10. The edging block of claim 9, wherein the means for removably holding the top section to the bottom section comprises a plurality of resilient clips extending from the bottom section, each of the plurality of resilient clips interfacing with a lock receiver of the top section.

11. The edging block of claim 9, wherein the apertures provide passage between edging block through which a wire, a tube, or a pipe passes through.

12. The edging block of claim 11, wherein the edging block contains an electronic circuit.

13. The edging block of claim 12, wherein the electronic circuit comprises an illumination device that, when energized, emits light that is visible from outside of the edging block.

14. The edging block of claim 9, wherein the top section comprises a plurality of ribs, the ribs providing additional structural support.

\* \* \* \* \*